United States Patent
Heckendorn et al.

(10) Patent No.: US 11,090,720 B2
(45) Date of Patent: Aug. 17, 2021

(54) METHOD FOR PRODUCING A POWDER-METALLURGICAL PRODUCT

(71) Applicant: Mahle International GmbH, Stuttgart (DE)

(72) Inventors: Heiko Heckendorn, Schopfheim (DE); Roland Ruch, Schopfheim (DE); Patrick Sutter, Schopfheim (DE); Rene Suetterle, Hausen (DE); Klaus Wintrich, Schopfheim (DE)

(73) Assignee: Mahle International GmbH

( * ) Notice: Subject to any disclaimer, the term of this patent is extended or adjusted under 35 U.S.C. 154(b) by 55 days.

(21) Appl. No.: 16/439,695

(22) Filed: Jun. 12, 2019

(65) Prior Publication Data

US 2019/0381570 A1    Dec. 19, 2019

(30) Foreign Application Priority Data

Jun. 15, 2018    (DE) .................... 10 2018 209 682.1

(51) Int. Cl.
   *B22F 5/00*    (2006.01)
   *B22F 3/16*    (2006.01)

(52) U.S. Cl.
   CPC ............. *B22F 5/008* (2013.01); *B22F 3/16* (2013.01); *B22F 2301/15* (2013.01);
   (Continued)

(58) Field of Classification Search
   CPC ......... B22F 5/008; B22F 3/16; B22F 2301/35
   See application file for complete search history.

(56) References Cited

U.S. PATENT DOCUMENTS 4,274,876 A * 6/1981 Kodama ............. C22C 33/0207
                                            75/243
4,933,008 A * 6/1990 Fujiki ................. C22C 32/0078
                                            123/188.8
(Continued)

FOREIGN PATENT DOCUMENTS

DE     103 36 407 A1    3/2005
DE     60300224 T2     12/2005
(Continued)

OTHER PUBLICATIONS

English abstract for DE-103 36 407.

*Primary Examiner* — Anthony J Zimmer
*Assistant Examiner* — Ricardo D Morales
(74) *Attorney, Agent, or Firm* — Fishman Stewart PLLC

(57) ABSTRACT

A method for producing a powder-metallurgical product may include providing a powder mixture, forming the powder mixture into a green body, and sintering the green body to form a resulting powder-metallurgical product. The powder mixture may include a first hard phase, a second hard phase, 0 to 1.8% by weight of graphite, 0 to 5% by weight each of cobalt, tri-iron phosphide, copper, bronze, phosphorous, sulphur, calcium fluoride and molybdenum, 0.1 to 1.8% by weight of a pressing aid and a flow improver, and a remaining proportion that is an iron-base powder. The first hard phase may include 52 to 78% by weight of molybdenum, 0 to 2% by weight of silicon, 0 to 1.5% by weight of copper, and a remaining weight proportion of iron and production-related contaminations. The second hard phase may include 0 to 0.8% by weight of manganese and less than 0.1% by weight of carbon.

20 Claims, 1 Drawing Sheet

(52) U.S. Cl.
CPC ....... *B22F 2301/20* (2013.01); *B22F 2301/35* (2013.01); *B22F 2302/40* (2013.01); *B22F 2302/45* (2013.01); *B22F 2303/45* (2013.01)

(56) References Cited

U.S. PATENT DOCUMENTS

| | | | |
|---|---|---|---|
| 6,039,785 A * | 3/2000 | Dalal | B22F 1/0003 75/235 |
| 6,599,345 B2 * | 7/2003 | Wang | C22C 33/0214 75/231 |
| 6,951,579 B2 | 10/2005 | Koyama | |
| 7,089,902 B2 * | 8/2006 | Sato | B22F 7/06 123/188.8 |
| 2013/0291822 A1 * | 11/2013 | Takahashi | C22C 38/12 123/188.3 |
| 2018/0209311 A1 | 7/2018 | Heckendorn et al. | |

FOREIGN PATENT DOCUMENTS

| | | |
|---|---|---|
| DE | 102015213706 A1 | 1/2017 |
| EP | 0497714 A1 | 8/1992 |

* cited by examiner

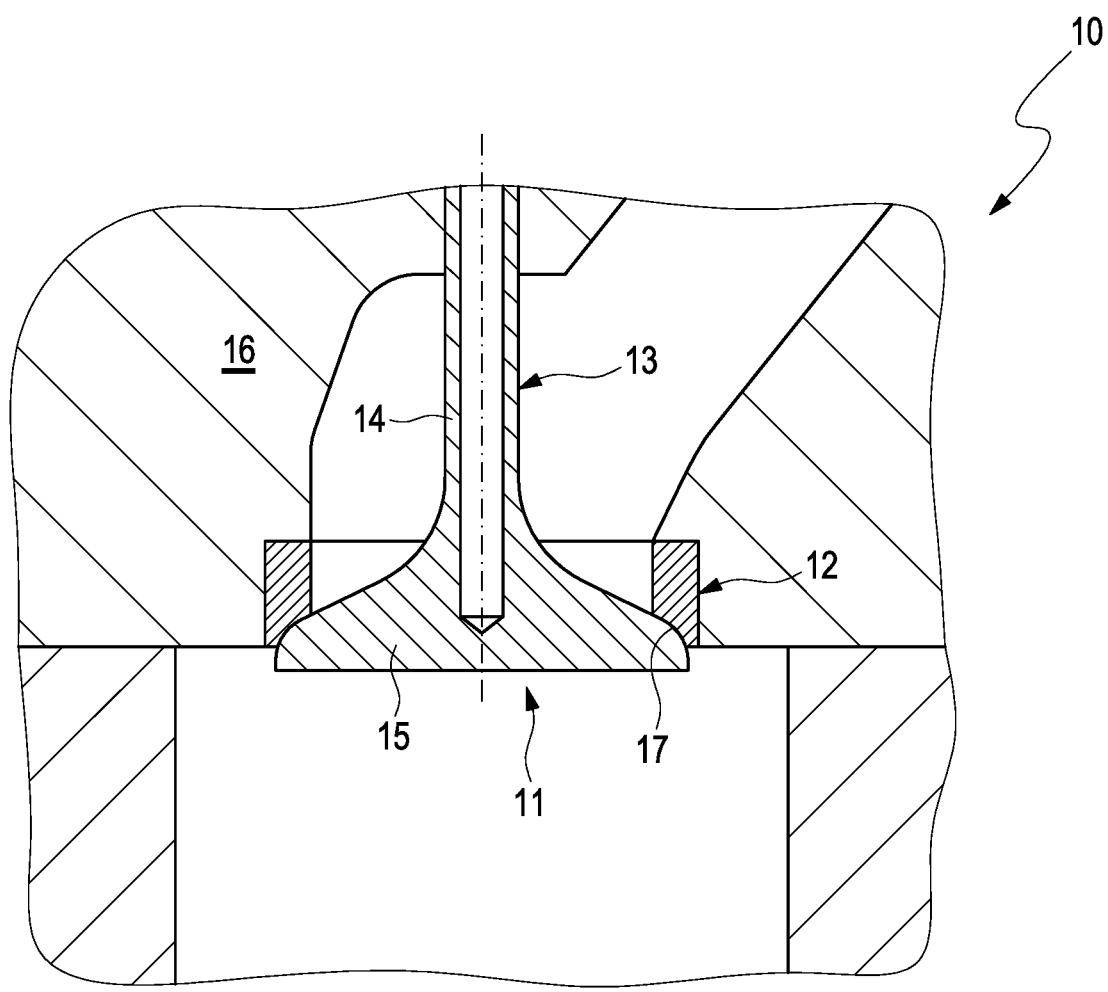

METHOD FOR PRODUCING A POWDER-METALLURGICAL PRODUCT

CROSS-REFERENCE TO RELATED APPLICATIONS

This application claims priority to German Patent Application No. DE 10 2018 209 682.1, filed on Jun. 15, 2018, the contents of which are hereby incorporated by reference in its entirety.

TECHNICAL FIELD

The invention relates to a method for producing a powder-metallurgical product, in particular a bearing, sealing or sliding element, a valve component or a valve seat ring, and a powder-metallurgical product which is produced by carrying out this method. The invention, furthermore, relates to a tribological system having such a powder-metallurgical product, and an internal combustion engine and an electric power machine each with such a powder-metallurgical product and, alternatively or additionally, such a tribological system.

BACKGROUND

It is known to powder-metallurgically produce bearing, sealing or sliding elements, valve components of valve seat rings for inlet and exhaust valves. Such powder-metallurgical production methods make possible a highly precise manufacture requiring only few reworking steps. At the same time, constituents which are normally admixable only with difficulty, for example lubricating and sliding agents, can also be admixed in a simple manner by way of powder-metallurgical products.

Such a powder-metallurgical production method is known from DE 103 36 407 A1.

SUMMARY

It is an object of the present invention to create an improved manufacturing method for powder-metallurgical products. By means of such a method, powder-metallurgical products with improved wear characteristics are to be produced in particular, so that the created powder-metallurgical products also have an increased lifespan when they are employed in an internal combustion or electric power machine.

According to the invention, this object is solved through the subject matter of the independent claim(s). Advantageous embodiments are subject matter of the dependent claim(s).

A method according to the invention serves for producing a powder-metallurgical product, in particular a bearing, sealing or sliding element, a valve component or a valve seat ring. According to the method, a powder mixture is provided. The powder mixture comprises a first hard phase, which contains 52 to 78% by weight of molybdenum, 0 to 2% by weight of silicon, 0 to 1.5% by weight of copper and as remaining weight proportion, iron and production-related contaminations, a second hard phase, which contains 0 to 0.8% by weight of manganese and less than 0.1% by weight of carbon, 0 to 1.8% by weight of graphite, 0 to 5% by weight each of cobalt, tri-iron phosphide, copper, bronze, phosphorous, sulfides, calcium fluoride and molybdenum, 0.1 to 1.8% by weight of pressing aid and flow improver and the remaining proportion of the total weight of the powder mixture is formed by an iron-base powder. The provided powder mixture is then formed into a green body in particular by pressing. Following this, the formed green body is sintered into the powder-metallurgical product.

According to a preferred embodiment of the method, the provided second hard phase contains 25 to 30% by weight of molybdenum, 6 to 11% by weight of chromium, 2 to 4.5% by weight of silicon, 0 to 5% by weight of iron, wherein the remaining proportion of the total weight of the second hard phase is formed by cobalt and production-related contaminations, or the second hard phase contains 26 to 32% by weight of molybdenum, 12 to 19% by weight of chromium, 2 to 5% by weight of silicon, 0 to 5% by weight of cobalt, wherein the remaining proportion of the total weight of the second hard phase is formed by iron and production-related contaminations. It was possible to show that improved wear characteristics of a powder-metallurgical product produced by means of this method according to the invention can be achieved.

According to an advantageous embodiment of the method, the proportion of the provided first and second hard phase in total amounts to 10 to 45% of the total weight of the powder mixture and the ratio of the weight proportion of the first hard phase relative to the weight proportion of the second hard phase amounts to between 3 to 1 and 1 to 3, or the proportion of first and second hard phase in total amounts to 22 to 40 percent of the total weight of the powder mixture and the ratio of the weight proportion of the first part phase to the weight proportion of the second hard phase amounts to between 2 to 1 and 1 to 2. By means of this embodiment, the wear resistance of a powder-metallurgical product produced by means of the method according to the invention can be even further optimised.

Particularly preferably, the provided iron-base powder contains at least one tool steel powder.

According to an another advantageous embodiment, 30 to 70% by weight of the provided iron-base powder are composed of a powder which comprises 0.8 to 1.3% by weight of carbon, 3 to 5% by weight of chromium, 0 to 1% by weight of cobalt, 0 to 0.5% by weight of manganese, 3 to 7% by weight of molybdenum, 0 to 1% by weight of silicon, 2 to 4% by weight of vanadium and 5 to 7.5% by weight of tungsten, wherein the remaining proportion of the total weight of the powder is formed by iron and production-related contaminations.

Particularly practically, the provided powder mixture is formed in particular by way of uni-axial pressing, to a green density of 6.3 g/cm$^3$ to 7.5 g/cm$^3$. This proves to be particularly advantageous for a further processing and for a metallurgic product produced by means of the method according to the invention.

Particularly practically, pores that are present in the formed green body are infiltrated with a copper base infiltrant during the sintering. This proves to be likewise particularly advantageous for a further processing and additionally improves the heat conductivity of a powder-metallurgical product produced by means of the method according to the invention.

Particularly preferably, the formed green body is sintered at a temperature between 1,065° C. and 1,195° C.

According to a preferred embodiment, the provided powder mixture contains more than 0.15% by weight and up to 5% by weight of tri-iron phosphide. Alternatively or additionally, the provided powder mixture contains more than 0% by weight and up to 5% by weight of bronze. Alternatively or additionally, the provided powder mixture contains more than 0% by weight and up to 5% by weight of phosphorous. It was possible to show that improved wear characteristics of a powder-metallurgical product produced by means of the method according to the invention can be achieved in this way.

According to a further preferred embodiment, the provided second hard phase contains more than 0% by weight and up to 0.8% by weight of manganese. The wear resistance of a powder-metallurgical product produced by means of the method according to the invention is even further improved also in this manner.

According to a further preferred embodiment, the provided first hard phase contains 0.4% by weight and up to 2.0% by weight of silicon. The wear resistance of a powder-metallurgical product produced by means of the method according to the invention is even further improved also in this manner.

The invention, furthermore, relates to a powder-metallurgical product which is produced by means of the method according to the invention. The advantages of the method according to the invention explained above subsequently apply also to the powder-metallurgical product according to the invention.

According to an advantageous embodiment of the powder-metallurgical product according to the invention, the powder-metallurgical product according to the invention contains 0.5 to 1.8% by weight of carbon, 2 to 9% by weight of chromium, 4 to 16% by weight of cobalt, 0 to 1.6% by weight of manganese, 10 to 22% by weight of molybdenum, 0 to 2% by weight of silicon, 0.5 to 6% by weight of vanadium, 1 to 8% by weight of tungsten, 5 to 25% by weight of copper, 0 to 2% by weight of calcium, 0 to 1.5% by weight of sulphur and 0 to 5% by weight of nickel, wherein the remaining proportion of the total weight of the powder-metallurgical product according to the invention is formed by iron and production-related contaminations.

According to a further advantageous embodiment of the powder-metallurgical product according to the invention, the powder-metallurgical product according to the invention contains 0.7 to 1.5% by weight of carbon, 2 to 5% by weight of chromium, 8 to 12% by weight of cobalt, 0 to 1% by weight of manganese, 12 to 18% by weight of molybdenum, 0 to 2% by weight of silicon, 1 to 3% by weight of vanadium, 2 to 4% by weight of tungsten, 10 to 20% by weight of copper, 0 to 0.5% by weight of calcium, 0 to 1% by weight of sulphur and 0 to 3% by weight of nickel, wherein the remaining proportion of the total weight of the powder-metallurgical product according to the invention is formed by iron and production-related contaminations.

The invention, furthermore, relates to a tribological system which comprises a powder-metallurgical product introduced above. The advantages of the method according to the invention and of the powder-metallurgical product according to the invention explained above thus also apply to the tribological system according to the invention.

According to a preferred embodiment of the tribological system according to the invention, the surface of the powder-metallurgical product according to the invention is in mechanical contact with an austenitic, ferritic or martensitic product and, alternatively or additionally, the surface of the powder-metallurgical product according to the invention is in mechanical contact with a nitrided or nitro-carburized product.

The invention, furthermore, relates to an internal combustion engine for a motor vehicle. The internal combustion engine comprises a powder-metallurgical product introduced above and, alternatively or additionally, a tribological system introduced above. The advantages of the method according to the invention, of the powder-metallurgical product according to the invention and of the tribological system according to the invention explained above therefore apply also to the internal combustion engine according to the invention.

The invention, furthermore, relates to an electric power machine for a motor vehicle. The electric power machine comprises a powder-metallurgical product introduced above and, alternatively or additionally, a tribological system introduced above. The advantages of the method according to the invention, of the powder-metallurgical product according to the invention and of the tribological system according to the invention explained above therefore apply also to the electric power machine according to the invention.

Further features and advantages of the invention are obtained from the subclaims, from the drawing and from the associated FIGURE description by way of the drawing.

It is to be understood that the features mentioned above and still to be explained in the following cannot only be used in the respective combination stated but also in other combinations or by themselves without leaving the scope of the present invention.

A preferred exemplary embodiment of the invention is shown in the drawing and is explained in more detail in the following description.

BRIEF DESCRIPTION OF THE DRAWINGS

The FIGURE illustrates a simplified example of a tribological system according to the invention.

DETAILED DESCRIPTION

The FIGURE depicts a tribological system 10, which is used in a cylinder head 16 of an internal combustion engine of a motor vehicle. The tribological system 10 comprises a valve opening 11, which can be closed by means of a valve body 13. The FIGURE shows the valve body 13 in a closing position. X45CrSi9-3, X50CrMnNiNbN21-9, X53CrMnNiNbN21-9 or Nimonic 80a can be used as material for the valve body 13. The valve body 13 can comprise a coating or hardening. The valve body 13 comprises a valve stem 14, which axially merges into a valve disc 15. The valve opening 11 is enclosed by a valve seat ring 12.

In a closing position shown in the FIGURE, the valve disc 15 closes the valve opening 11. To this end, the valve disc 15 lies with a contact portion 17 against the valve seat ring 12. The valve seat ring 12 can be nitrided and hardened in this manner.

The valve seat ring 12 can contain 0.5 to 1.8% by weight of carbon, 2 to 9% by weight of chromium, 4 to 16% by weight of cobalt, 0 to 1.6% by weight of manganese, 10 to 22% by weight of molybdenum, 0 to 2% by weight of silicon, 0.5 to 6% by weight of vanadium, 1 to 8% by weight of tungsten, 5 to 25% by weight of copper, 0 to 2% by weight of calcium, 0 to 1.5% by weight of sulphur and 0 to 5% by weight of Nickel, wherein the remaining proportion of the total weight of the powder-metallurgical product according to the invention is formed by iron and production-related contaminations. Alternatively, the valve seat ring 12 can contain 0.7 to 1.5% by weight of carbon, 2 to 5% by weight of chromium, 8 to 12% by weight of cobalt, 0 to 1% by weight of manganese, 12 to 18% by weight of molybdenum, 0 to 2% by weight of silicon, 1 to 3% by weight of vanadium, 2 to 4% by weight of tungsten, 10 to 20% by weight of copper, 0 to 0.5% by weight of calcium, 0 to 1% by weight of sulphur and 0 to 3% by weight of nickel, wherein the remaining proportion of the total weight of the powder-metallurgical product according to the invention is formed by iron and production-related contaminations.

The valve seat ring 12 was produced by means of the method according to the invention, i.e. in a powder-metallurgical manner.

In the method for producing the valve seat ring 12, a powder mixture is provided and formed into a green body for the valve seat ring 12.

The provided starting material can be formed by means of pressing, in particular by uni-axial pressing, to a green density of 6.3 g/cm$^3$ to 7.5 g/cm$^3$.

The formed green body is subsequently sintered. During the process, existing pores in the formed green body can be infiltrated with a copper base infiltrant during the sintering. The formed green body can be sintered at a temperature between 1,065° C. and 1,195° C. Instead of a sintering operation, hot-rolling of the green body is also possible.

The powder mixture comprises a first hard phase, which contains 52 to 78% by weight of molybdenum, 0 to 2% by weight of silicon, 0 to 1.5% by weight of copper and as remaining weight proportion iron and production-related contaminations, a second hard phase, which contains 0 to 0.8% by weight of manganese and less than 0.1% by weight of carbon, 0 to 1.8% by weight of graphite, 0 to 5% by weight each of cobalt, tri-iron phosphide, copper, bronze, phosphorous, sulfide, calcium fluoride and molybdenum, 0.1 to 1.8% by weight of pressing aid and flow improver and the remaining proportion of the total weight of the starting material is formed by an iron-base powder.

The provided powder mixture can also contain more than 0.15% by weight and up to 5% by weight of tri-iron phosphate. Alternatively or additionally, the provided powder mixture can also contain more than 0% by weight and up to 5% by weight of bronze. Alternatively or additionally, the provided powder mixture can also contain more than 0% by weight and up to 5% by weight of phosphorous.

The provided second hard phase can likewise contain more than 0% by weight and up to 0.8% by weight of manganese.

The provided first hard phase can also contain 0.4% by weight and up to 2.0% by weight of silicon.

In addition, the provided second hard phase can contain 25 to 30% by weight of molybdenum, 6 to 11% by weight of chromium, 2 to 4.5% by weight of silicon and 0 to 5% by weight of iron, wherein the remaining proportion of the total weight of the second hard phase is formed by cobalt and production-related contaminations. Alternatively, the second hard phase can contain 26 to 32% by weight of molybdenum, 12 to 19% by weight of chromium, 2 to 5% by weight of silicon and 0 to 5% by weight of cobalt, wherein the remaining proportion of the total weight of the second hard phase is formed by iron and production-related contaminations.

In addition to this, the proportion of the provided first and second hard phase can in total amount to 10 to 45 percent of the base material and the ratio of the weight proportion of the first hard phase to the weight proportion of the second hard phase can amount to between 3 to 1 and 1 to 3. Alternatively, the proportion of the first and second hard phase in total can amount to 22 to 40 percent of the total weight of the powder mixture and the ratio of the weight proportion of the first hard phase to the weight proportion of the second hard phase can amount to between 2 to 1 and 1 to 2.

Furthermore, the provided iron-base powder of the starting material can contain at least 1 to 2 steel powder. In addition to this, 30 to 70% by weight of the provided iron-base powder can be composed of a further powder, which comprises 0.8 to 1.3% by weight of carbon, 3 to 5% by weight of chromium, 0 to 1% by weight of cobalt, 0 to 0.5% by weight of manganese, 3 to 7% by weight of molybdenum, 0 to 1% by weight of silicon, 2 to 4% by weight of vanadium and 5 to 7.5% by weight of tungsten, wherein the remaining proportion of the total weight of the further powder is formed by iron and production-related contaminations.

In the manner shown above, other powder-metallurgical products, in particular bearing, sealing or sliding elements, valve components or valve bodies can likewise be produced in the manner shown above.

The invention claimed is:

1. A method for producing a powder-metallurgical product, comprising:
    providing a powder mixture including:
        a first hard phase, which includes 52 to 78% by weight of molybdenum, 0.4% to 2% by weight of silicon, 0 to 1.5% by weight of copper and a remaining weight proportion of iron and production-related contaminations;
        a second hard phase including manganese, the second hard phase including 0.8% by weight or less of manganese and less than 0.1% by weight of carbon;
        0 to 1.8% by weight of graphite;
        0 to 5% by weight each of cobalt, tri-iron phosphide, copper, bronze, phosphorous, sulphur, calcium fluoride and molybdenum;
        0.1 to 1.8% by weight of each of a pressing aid and a flow improver; and
        a remaining proportion of a total weight of the powder mixture is an iron-base powder;
    forming the powder mixture into a green body; and
    sintering the green body to form a resulting powder-metallurgical product.

2. The method according to claim 1, wherein one of:
    the second hard phase further includes 25 to 30% by weight of molybdenum, 6 to 11% by weight of chromium, 2 to 4.5% by weight of silicon, 0 to 5% by weight of iron, and a remaining proportion of a total weight of the second hard phase is cobalt and production-related contaminations; and
    the second hard phase further includes 26 to 32% by weight of molybdenum, 12 to 19% by weight of chromium, 2 to 5% by weight of silicon, 0 to 5% by weight of cobalt, and a remaining proportion of a total weight of the second hard phase is iron and production-relating contaminations.

3. The method according to claim 1, wherein one of:
    the first hard phase and the second hard phase in total amount to 10 to 45% of the total weight of the powder mixture and a ratio of a weight proportion of the first hard phase to a weight proportion of the second hard phase amounts to between 3 to 1 and 1 to 3; and
    the first hard phase and the second hard phase in total amount to 22 to 40% of the total weight of the powder mixture and a ratio of a weight proportion of the first hard phase to a weight proportion of the second hard phase amounts to between 2 to 1 and 1 to 2.

4. The method according to claim 1, wherein the iron-base powder includes at least one tool steel powder.

5. The method according to claim 1, wherein 30 to 70% by weight of the iron-base powder is composed of a powder including 0.8 to 1.3% by weight of carbon, 3 to 5% by weight of chromium, 0 to 1% by weight of cobalt, 0 to 0.5% by weight of manganese, 3 to 7% by weight of molybdenum, 0 to 1% by weight of silicon, 2 to 4% by weight of vanadium, 5 to 7.5% by weight of tungsten, and a remaining proportion of a total weight of the powder is iron and production-related contaminations.

6. The method according to claim 1, wherein forming the powder mixture into a green body includes uni-axial pressing the powder mixture to a green density of 6.3 g/cm³ to 7.5 g/cm³.

7. The method according to claim 1, further comprising infiltrating a plurality of pores in the green body with a copper base infiltrant when sintering the green body.

8. The method according to claim 1, wherein the green body is sintered at a temperature of 1,065° C. to 1,195° C.

9. The method according to claim 1, wherein at least one of:
the powder mixture includes 0.15% by weight to 5% by weight of tri-iron phosphide;
the powder mixture includes more than 0% by weight to 5% by weight of bronze; and
the powder mixture includes more than 0% by weight to 5% by weight of phosphorous.

10. The method according to claim 1, wherein the powder mixture is formed into the green body via pressing.

11. The method according to claim 1, wherein the resulting powder-metallurgical product is one of a bearing, a sealing element, a sliding element, a valve component, and a valve seat ring.

12. The method according to claim 1, wherein a total weight of the resulting powder-metallurgical product includes 0.5 to 1.8% by weight of carbon, 2 to 9% by weight of chromium, 4 to 16% by weight of cobalt, 0 to 1.6% by weight of manganese, 10 to 22% by weight of molybdenum, 0 to 2% by weight of silicon, 0.5 to 6% by weight of vanadium, 1 to 8% by weight of tungsten, 5 to 25% by weight of copper, 0 to 2% by weight of calcium, 0 to 1.5% by weight of sulphur, 0 to 5% nickel, and a remaining proportion of the total weight of the resulting powder-metallurgical product is iron and production-related contaminations.

13. The method according to claim 1, wherein a total weight of the resulting powder-metallurgical product includes 0.7 to 1.5% by weight of carbon, 2 to 5% by weight of chromium, 8 to 12% by weight of cobalt, 0 to 1% by weight of manganese, 12 to 18% by weight of molybdenum, 0 to 2% by weight of silicon, 1 to 3% by weight of vanadium, 2 to 4% by weight of tungsten, 10 to 20% by weight of copper, 0 to 0.5% by weight of calcium, 0 to 1% by weight of sulphur, 0 to 3% by weight of nickel, and a remaining proportion of the total weight of the resulting powder-metallurgical product is iron and production-related contaminations.

14. The method according to claim 1, wherein the pressing aid and the flow improver collectively defined 1.8% by weight or less of the powder mixture.

15. The method according to claim 1, wherein the powder mixture includes 0.15% by weight to 5% by weight of tri-iron phosphide.

16. The method according to claim 1, wherein the powder mixture includes each of graphite, cobalt, tri-iron phosphide, copper, bronze, phosphorous, sulphur, calcium fluoride, molybdenum, the pressing aid, the flow improver, and the iron-base powder.

17. The method according to claim 1, wherein:
the first hard phase and the second hard phase in total amount to 10 to 45% of the total weight of the powder mixture; and
a ratio of a weight proportion of the first hard phase to a weight proportion of the second hard phase is one of 3:1, 2:1, 1:2, and 1:3.

18. A method for producing a powder-metallurgical product, comprising:
providing a powder mixture;
forming the powder mixture into a green body; and
sintering the green body to form a resulting powder-metallurgical product;
wherein the powder mixture includes:
a first hard phase, which includes 52 to 78% by weight of molybdenum, 0 to 2% by weight of silicon, 0 to 1.5% by weight of copper and a remaining weight proportion of iron and production-related contaminations;
a second hard phase, which includes 0 to 0.8% by weight of manganese and less than 0.1% by weight of carbon;
0 to 1.8% by weight of graphite;
0 to 5% by weight each of cobalt, tri-iron phosphide, copper, bronze, phosphorous, sulphur, calcium fluoride and molybdenum;
0.1 to 1.8% by weight of each of a pressing aid and a flow improver; and
a remaining proportion of a total weight of the powder mixture is an iron-base powder; and
wherein 30 to 70% by weight of the iron-base powder is composed of a powder including 0.8 to 1.3% by weight of carbon, 3 to 5% by weight of chromium, 0 to 1% by weight of cobalt, 0 to 0.5% by weight of manganese, 3 to 7% by weight of molybdenum, 0 to 1% by weight of silicon, 2 to 4% by weight of vanadium, 5 to 7.5% by weight of tungsten, and a remaining proportion of a total weight of the powder is iron and production-related contaminations.

19. A method for producing a powder-metallurgical product, comprising:
providing a powder mixture including a first hard phase, a second hard phase, graphite, cobalt, tri-iron phosphide, copper, bronze, phosphorous, sulphur, calcium fluoride, molybdenum, a pressing aid, a flow improver, and an iron-base powder, the first hard phase including molybdenum, silicon, copper, and iron, and the second hard phase including manganese;
forming the powder mixture into a green body; and
sintering the green body to form a resulting powder-metallurgical product;
wherein the first hard phase includes 52 to 78% by weight of molybdenum, 2% by weight or less of silicon, 1.5% by weight or less of copper, and a remaining weight proportion of iron and production-related contaminations;
wherein the second hard phase includes 0.8% by weight or less of manganese and less than 0.1% by weight of carbon; and
wherein:
the first hard phase and the second hard phase collectively amount to 10 to 45% by weight of the powder mixture;
graphite amounts to 1.8% by weight or less of the powder mixture;
each of cobalt, tri-iron phosphide, copper, bronze, phosphorous, sulphur, calcium fluoride, and molybdenum amount to 5% by weight or less of the powder mixture;
each of the pressing aid and the flow improver amount to 0.1 to 1.8% by weight of the powder mixture; and the iron-base powder forms the remainder of the powder mixture.

20. A method for producing a powder-metallurgical product, comprising:
   providing a powder mixture;
   forming the powder mixture into a green body; and
   sintering the green body to form a resulting powder-metallurgical product including carbon, chromium, cobalt, manganese, molybdenum, silicon, vanadium, tungsten, copper, calcium, sulphur, nickel, and iron;
   wherein the powder mixture includes:
      a first hard phase, which includes 52 to 78% by weight of molybdenum, 0 to 2% by weight of silicon, 0 to 1.5% by weight of copper and a remaining weight proportion of iron and production-related contaminations;
      a second hard phase, which includes 0 to 0.8% by weight of manganese and less than 0.1% by weight of carbon;
      0 to 1.8% by weight of graphite;
      0 to 5% by weight each of cobalt, tri-iron phosphide, copper, bronze, phosphorous, sulphur, calcium fluoride and molybdenum;
      0.1 to 1.8% by weight of each of a pressing aid and a flow improver; and
      a remaining proportion of a total weight of the powder mixture is an iron-base powder; and
   wherein the resulting powder-metallurgical product includes 0.7 to 1.5% by weight of carbon, 2 to 5% by weight of chromium, 8 to 12% by weight of cobalt, 1% by weight or less of manganese, 12 to 18% by weight of molybdenum, 2% by weight or less of silicon, 1 to 3% by weight of vanadium, 2 to 4% by weight of tungsten, 10 to 20% by weight of copper, 0.5% by weight or less of calcium, 1% by weight or less of sulphur, 3% by weight or less of nickel, and a remainder iron and production-related contaminations.

* * * * *